(12) United States Patent
Floury

(10) Patent No.: US 10,887,755 B2
(45) Date of Patent: Jan. 5, 2021

(54) METHOD, DEVICE, TERMINAL AND PROGRAM FOR CONTROLLING ACTIVATION OF A TERMINAL

(71) Applicant: Orange, Paris (FR)

(72) Inventor: Cedric Floury, Chatillon (FR)

(73) Assignee: ORANGE, Paris (FR)

( * ) Notice: Subject to any disclaimer, the term of this patent is extended or adjusted under 35 U.S.C. 154(b) by 3 days.

(21) Appl. No.: 16/423,771

(22) Filed: May 28, 2019

(65) Prior Publication Data

US 2019/0373445 A1 Dec. 5, 2019

(30) Foreign Application Priority Data

May 29, 2018 (FR) .................................... 18 54554

(51) Int. Cl.
| | | |
|---|---|---|
| *G06F 3/033* | (2013.01) | |
| *H04W 8/18* | (2009.01) | |
| *H04W 12/04* | (2009.01) | |
| *H04W 88/04* | (2009.01) | |
| *H04W 88/02* | (2009.01) | |

(52) U.S. Cl.
CPC ....... *H04W 8/183* (2013.01); *H04W 12/0401* (2019.01); *H04W 12/04071* (2019.01); *H04W 88/04* (2013.01); *H04W 88/023* (2013.01)

(58) Field of Classification Search
None
See application file for complete search history.

(56) References Cited

U.S. PATENT DOCUMENTS

| | | | | |
|---|---|---|---|---|
| 9,027,117 | B2 * | 5/2015 | Wilairat | G06F 21/36 726/17 |
| 2007/0180400 | A1 * | 8/2007 | Zotov | G06F 3/04845 715/788 |
| 2011/0105103 | A1 * | 5/2011 | Ullrich | G06F 3/038 455/420 |
| 2011/0163967 | A1 * | 7/2011 | Chaudhri | G06F 3/0485 345/173 |
| 2012/0212513 | A1 * | 8/2012 | Tseng | G06F 3/04842 345/661 |
| 2013/0318451 | A1 * | 11/2013 | Wu | G06F 3/0354 715/754 |
| 2013/0321305 | A1 * | 12/2013 | Liang | G06F 3/04883 345/173 |

(Continued)

OTHER PUBLICATIONS

French Search Report and Written Opinion dated Feb. 15, 2019 for corresponding French Application No. 1854554, filed May 29, 2018.

(Continued)

*Primary Examiner* — Sithu Ko
(74) *Attorney, Agent, or Firm* — David D. Brush; Westman, Champlin & Koehler, P.A.

(57) ABSTRACT

A method for activating a first terminal from a second terminal, the first terminal and the second terminal being connected via a communication network. The method includes associating the first terminal with the second terminal, detecting an action on an input peripheral device associated with the second terminal, and transmitting a notification to the first terminal, the notification having at least one command suitable for authorizing unlocking of the first terminal.

7 Claims, 4 Drawing Sheets

(56) References Cited

U.S. PATENT DOCUMENTS

| | | | |
|---|---|---|---|
| 2014/0019652 A1* | 1/2014 | Soffer | G06F 21/84 710/73 |
| 2015/0135120 A1* | 5/2015 | Tanaka | G06F 3/0481 715/773 |
| 2016/0197918 A1 | 7/2016 | Turgeman et al. | |
| 2016/0342784 A1 | 11/2016 | Beveridge et al. | |
| 2017/0180672 A1* | 6/2017 | Lee | G06F 3/0346 |
| 2018/0067713 A1* | 3/2018 | Morgan | G06F 3/1454 |
| 2018/0224980 A1* | 8/2018 | Avila | G01S 13/42 |

OTHER PUBLICATIONS

J. Rosenberg et al., "SIP: Session Initiation Protocol", Network Working Group, RFC3261 IETF, dated Jun. 2002.
M. Boucadair et al., "Universal Plug and Play (UPnP) Internet Gateway Device—Port Control Protocol Interworking Function (IGD-PCP IWF)", Internet Engineering Task Force (IETF), RFC6970 IETF, dated Jul. 2013.

\* cited by examiner

METHOD, DEVICE, TERMINAL AND PROGRAM FOR CONTROLLING ACTIVATION OF A TERMINAL

TECHNICAL FIELD

The invention belongs to the field of terminals and relates more particularly to a method for activating a first terminal from a second terminal.

PRIOR ART

Conventionally, a user interacts with a personal computer by means of input devices such as a keyboard and/or a pointing device. Thus, to use several computers, several keyboards and mice are generally necessary. Such a proliferation of these input devices poses a problem of clutter.

Solutions have been proposed for pooling input devices between different terminals. In this way, it is possible to declutter a desk when several computers are used. For example, one and the same keyboard can be used to input data on different terminals.

A first technique consists in using a hardware switch. A keyboard and a mouse are then connected to the switch, the switch being itself connected to at least two computers. A control on the switch makes it possible to connect the input devices to one or other of the computers to which the switch is connected.

A second technique consists in installing particular software on each of the computers with which there is a desire to share a keyboard and/or a mouse. The keyboard and/or the mouse are then connected physically to a single computer on which is installed server software whose role is to intercept the interactions of the user with the keyboard and the mouse and to retransmit them to client software installed on the computer that the user wants to control. The user selects the computer that he or she wants to control by moving, for example, his or her mouse to a particular location on the screen, generally on an edge of the screen. Thus, when the mouse pointer reaches a particular position on the screen of a first computer, the keyboard and the mouse are virtually connected to a second computer.

This second technique allows a keyboard and a mouse to be shared between heterogeneous terminals, such as, for example, between a computer and a touch tablet, independently of the operating system with which they are equipped. It is thus possible to configure a computer and a mobile terminal so that, when the mouse pointer of the computer reaches, for example, an edge of the screen, an additional movement of the pointer provokes the redirection of the interactions of the keyboard and of the mouse to the terminal, such that the user can interact with the terminal from the keyboard and the mouse of the computer.

The use of such a technique with touch terminals of tablet or smartphone type does however pose a particular problem. In effect, since these terminals are designed for roaming, they generally operate on battery and switch automatically to an energy-saving mode when they are not used for a certain period. They then have to be reactivated by a manual action of the user before being usable, such as, for example, the input of an unlock code, or the performance of a particular gesture on the screen of the terminal. As long as the terminal is not unlocked, it is therefore not possible to control it from a keyboard and a mouse shared with another device.

The fact of having to manually unlock the terminal before being able to use a keyboard and/or a mouse is prejudicial to the user experience and reduces the benefit of the sharing of a keyboard and/or of a mouse between a computer and the terminal.

Thus, there is a need for a solution that makes it possible to trigger the sharing of input peripheral devices between a computer and a touch terminal without it being necessary for the user to perform a manual action on the touch terminal.

SUMMARY OF THE INVENTION

To this end, a method is proposed for activating a first terminal from a second terminal, the first terminal and the second terminal being connected via a communication network, the method being such that it comprises the following steps performed by the second terminal:
- association of the first terminal with the second terminal,
- detection of an action on an input peripheral device associated with the second terminal,
- transmission of a notification to the first terminal, the notification comprising at least one command suitable for authorizing the unlocking of the first terminal.

In this way, contrary to the prior art, a mobile terminal associated with a computer can be unlocked without manual interaction of the user on the terminal. A particular action performed with an input peripheral device of the computer, such as a particular movement of a mouse connected to the computer for example, triggers the transmission of an unlock command to the mobile terminal. The association of the first terminal with the second terminal allows the second terminal to detect the presence of the first terminal and to secure the activation of the first terminal by ensuring that only an associated terminal is authorized to proceed with the activation.

The unlocking of the first terminal corresponds, for example, to the input of a security code, to the performance of a particular gesture on a screen of the first terminal, to the pressing on a button or to any other manipulation aiming to switch the terminal from a state of partial inactivity or of standby to an active state capable of accepting interactions performed using input peripheral devices of the second terminal.

According to a particular embodiment, the method is such that the step of association of the first terminal with the second terminal comprises the exchange of at least one encryption key between the first and second terminals, the notification transmitted to the first terminal comprising at least one datum encrypted using the encryption key.

The use of a shared secret such as an encryption key offers enhanced security by avoiding an individual being able to take control of the first terminal without being authorized thereon. Thus, only a terminal having the encryption key supplied by the first terminal can trigger its unlocking.

According to a particular embodiment, the input peripheral device is a pointing peripheral device.

The first terminal can thus be unlocked from an action on a mouse or a touch surface associated with the second terminal. In this way, the user can unlock and use the first terminal by keeping the hand on the pointing device used with the second terminal.

According to a particular embodiment, the step of detection of an action comprises the detection that the pointing device is in a particular detection zone of the screen of the second terminal.

Thus, a user can unlock a mobile terminal such as the first terminal by simply moving the pointer of a mouse to a particular zone of the screen. The user does not need to let go of the mouse, so the ergonomics are then optimal.

According to a particular embodiment, the detection zone is a defined rectangular zone on the screen of the second terminal, having at least one side contiguous with an edge of the screen of the second terminal, the second terminal being also configured to transmit to the first terminal interactions detected on input peripheral devices when the pointing device reaches said edge of the screen of the second terminal.

Conventionally, the techniques that make it possible to share the mouse of a computer with another terminal trigger the transfer of the movements of the mouse to the screen of the second terminal when the pointer reaches an edge of the screen of the first terminal, and vice versa. When the action detected is the positioning of the mouse pointer at the edge of the screen, the execution of the steps of the activation method introduces a delay before the pointer can be used on the second terminal: the mouse pointer will be blocked at the edge of the screen while waiting for the unlocking sequence to finish on the second terminal.

By proposing the use of a rectangular detection zone contiguous with at least one edge of the screen, the method advantageously makes it possible to reduce this latency.

The use of a rectangular zone forms a certain width between the side of the detection zone which is contiguous to the edge of the screen and its opposite side. It is thus possible to detect the arrival of the pointer in the detection zone before it reaches the edge of the screen, and thus to trigger the unlocking sequence earlier. The terminal can in this way be already reactivated when the pointer reaches the edge of the screen and the movements of the mouse can be fluidly transferred to the second terminal.

The zone can also have another form. For example, it can be a semi-circular zone having an intersection with an edge of the screen, a rectangle with rounded corners, or any other form whose dimensions and position are such that the movement of the pointer within the zone is necessary to reach a location provoking the transfer of the interactions of the mouse to an associated terminal.

According to a particular embodiment, at least one dimension of the detection zone is determined according to the speed of movement of the pointing device.

A dimension of the detection zone is thus determined as a function of an estimation of the time needed for the pointer to cover the zone according to this dimension at the measured speed, the speed being measured when the pointer is outside of the detection zone. It is thus possible to provoke the unlocking of the terminal before the pointer reaches the edge of the screen of the terminal 100.

When the mouse is moved rapidly, it can cross the detection zone and reach the edge of the screen too quickly for the unlocking sequence to have had the time be completed. By increasing the size of the detection zone when the mouse is moved rapidly, the unlocking sequence is triggered earlier and has a greater chance of being finished before the mouse reaches the edge of the screen. For example, the distance between a side of the zone contiguous with the edge of the screen and the opposite side can be increased when the mouse is moved rapidly to anticipate the unlocking, and reduced when the mouse is moved slowly to avoid untimely unlockings.

According to another aspect, the invention targets a device for activating a first touch terminal from a second terminal, the first terminal and the second terminal being connected via a communication network, the device being such that it comprises:

a module for associating a terminal with the device, a module for detecting an action on an input peripheral device associated with the device, a communication module configured to transmit a notification to the terminal, the notification comprising at least one command suitable for authorizing the unlocking of the terminal.

According to yet another aspect, a terminal is proposed comprising an activation device as described above.

In a particular embodiment, the different steps of the method according to the invention are determined by instructions of computer programs.

Consequently, the invention also targets a computer program comprising instructions suitable for implementing the steps of a method as described above, when the program is run by a processor.

This program can use any programming language, and be in the form of source code, object code, or of intermediate code between source code and object code, such as in a partially compiled form, or in any other desirable form.

The invention also targets a computer-readable storage medium on which is stored a computer program comprising instructions for the execution of the steps of the method.

The information medium can be any entity or device capable of storing the program. For example, the medium can comprise a storage means, such as a ROM, for example a CD-ROM or a microelectronic circuit ROM, a flash memory, or even a magnetic storage means, for example a diskette (floppy disk) or a hard disk.

Also, the information medium can be a transmissible medium such as an electrical or optical signal, which can be routed via an electrical or optical cable, by radio or by other means. The program according to the invention can in particular be downloaded over a network of internet type.

Alternatively, the information medium can be an integrated circuit in which the program is incorporated, the circuit being adapted to execute or to be used in the execution of the method concerned.

The devices, information media and programs offer advantages similar to those of the method previously presented.

The various abovementioned embodiments or features can be added independently or in combination with one another, to the steps of the method.

BRIEF DESCRIPTION OF THE FIGURES

Other features and advantages will become apparent on reading preferred embodiments described with reference to the figures in which.

DETAILED DESCRIPTION

Figure 1:
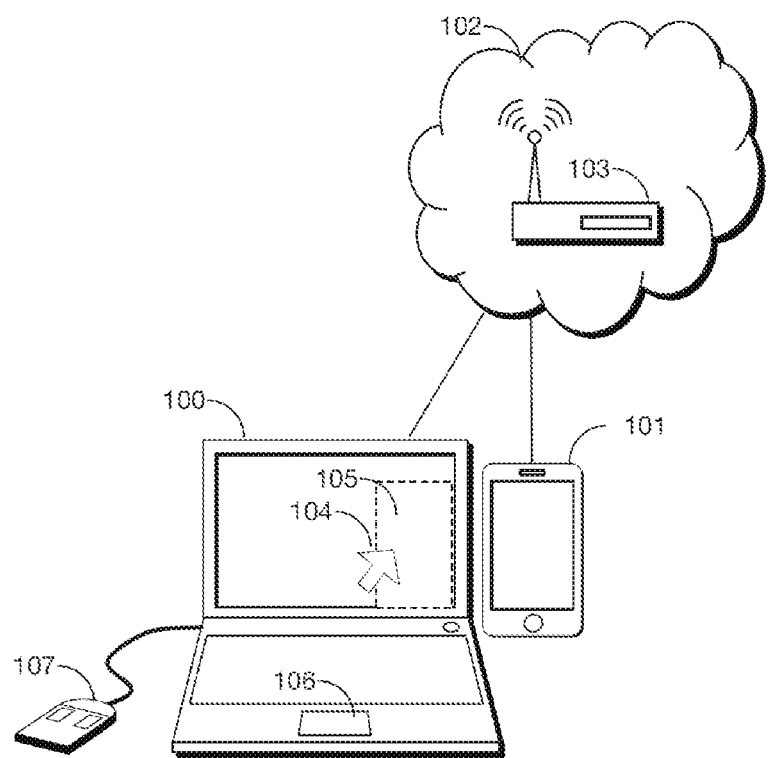
FIG. 1 represents an architecture suitable for implementing the method according to a particular embodiment.

FIG. 1 represents a local area network 102 to which are connected a portable computer 100 and a mobile terminal 101. The local area network is for example a wireless network of WiFi type comprising a WiFi router 103. Any other network architecture allowing the terminals 100 and 101 to communicate with one another can however be used to implement the method. For example, the network 102 can correspond to an ad hoc WiFi or Bluetooth connection between the terminals 100 and 101. The terminals 100 and 101 can also communicate via a cellular data connection of the terminal 101, by a wired connection or by any other known communication means.

The terminal 101 can be a mobile terminal, a tablet, a personal computer, a television or any other terminal suitable for being controlled by input peripheral devices of the terminal 100. The terminal 101 can also comprise a touch screen.

The computer 100 comprises at least one pointing device, for example a mouse 107 or a touch surface 106 allowing the user to move a pointer 104 on the screen in order to point to a particular zone on the screen.

In particular, a user can use one of the pointing devices to move the pointer in a predefined zone 105. In FIG. 1, the predefined zone 105 is represented in the bottom right of the screen of the computer 100, but any other location of the predefined zone can be envisaged. Furthermore, the predefined zone can have a form, dimensions or proportions different from those represented in FIG. 1.

Figure 2:
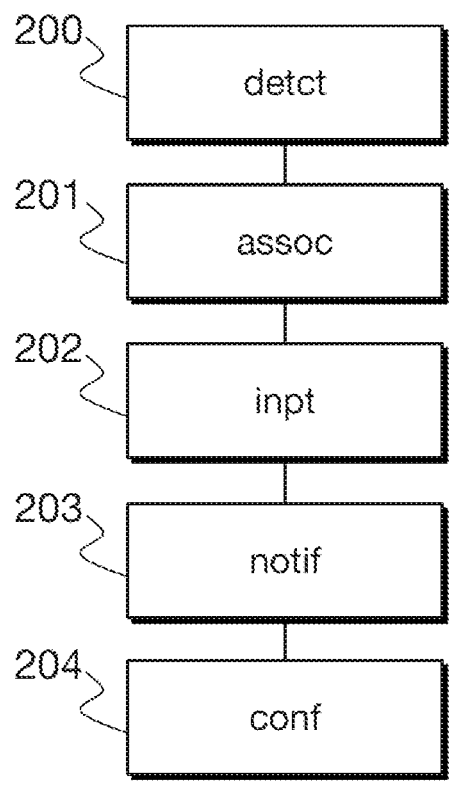
FIG. 2 illustrates the steps of the activation method according to a particular embodiment.

FIG. 2 illustrates the steps of the activation method according to a particular embodiment.

In a first step 200, the terminal 100 detects the terminal 101. The terminal 100 can detect the terminal 101 in several ways. For example, the terminal 101 can regularly broadcast an announcement message indicating its availability for an association. On reception of such an announcement message, the computer 100 can then present to the user an interface prompting him or her to associate the duly detected terminal. Obviously, several terminals 101 can be detected by the computer 100. The terminal 101 can for example broadcast the announcement message in accordance with the Bluetooth standard or via a WiFi network, by using for example the Apple "Bonjour" protocol or the "UPnP" standard (RFC6970 IETF "Universal Plug and Play"). Any technology allowing the discovery of a terminal by another terminal in order to exchange messages is suitable for implementing the invention.

As a variant, the step of detection of the terminal 101 by the terminal 100 can comprise the explicit designation of the terminal 101, for example by means of an IP address of the terminal 101, of an SIP URI (RFC3261 IETF "Session Initiation Protocol") or of a telephone number associated with the terminal.

The detection of the terminal 101 by the terminal 100 can also be performed through a wired connection between the terminal 101 and the computer 100, for example by a USB connection of the terminal 101 to the computer 100.

In a second step 201, the terminal 101 is associated with the terminal 100. For that, the terminal 100 generates a private key/public key pair. Such a private key/public key pair allows an asymmetrical encryption of a communication between the terminal 100 and the terminal 101: the public key PUK allows any terminal which has it to encrypt data which will only be able to be decrypted by a terminal holding the private key PRK. In this way, the computer 100 transmits an encryption key allowing the terminal 101 to send encrypted data that only the computer 100 which holds the corresponding private key will be able to decrypt.

According to a first embodiment, the terminal 101 uses the public key received to encrypt a symmetrical encryption key SK specific to the terminal 101 and transmit it to the terminal 100.

The terminals 100 and 101 thus have one and the same symmetrical encryption key SK making it possible to encrypt and decrypt messages that they exchange, this key having been exchanged securely by virtue of the public key transmitted by the terminal 100. The symmetrical encryption offers the advantage of being less costly than an asymmetrical encryption, and allows a saving of resources on the terminals.

The confidentiality of the exchanges between the terminals 100 and 101 is thus guaranteed. Such an arrangement also allows the terminal 100, respectively 101, to authenticate the messages received from the terminal 101, respectively 100, because only they hold the key SK that makes it possible to encrypt/decrypt the messages.

According to a particular embodiment, the method comprises a step of transmission, in a message encrypted using the symmetrical key SK by the terminal 101 intended for the terminal 100, of a code that makes it possible to unlock the terminal 101. The terminal 101 uses the public key received to encrypt an activation code suitable for authorizing the unlocking of the terminal 101.

According to a particular embodiment, the code allowing the unlocking is associated on the terminal 101 with at least one validity criterion.

The validity criterion is, for example, a time band allowing the unlocking of the terminal 101 only during a determined time period.

The validity criterion can also correspond to a maximum number of unlockings authorized with the code. For example, the validity criterion can be configured so as to authorize only a single unlocking of the terminal 101 by the terminal 100, so that a second use of one and the same code to unlock the terminal results in a refusal to unlock the terminal.

The validity criterion can also be a datum that makes it possible to identify one or more terminals authorized to use the code. It is thus possible to limit the use of a particular code to a particular terminal.

The validity criterion can also be an IP address of a terminal authorized to use the code, a range of IP addresses corresponding to a computer network such as the network 102, from which the use of the code to unlock the terminal 101 is possible.

In the step 202, the terminal 100 detects an action of the user on an input peripheral device 107 or 106 associated with the terminal 100. The computer 100 detects, for example, a particular movement of the pointer 104 by means of the mouse 107 or of the touch surface 106.

The detected movement can be particular in that the movement of the pointer 104 on the screen of the terminal 100 describes a particular pattern. For example, an action can be detected when the movement of the pointer 104 corresponds to a circle, a rectangle, a broken line or any other geometrical pattern. The detection of the pattern is performed in a known manner from a history of the positions occupied by the pointer over a predetermined time period, and/or by the closing of a geometrical form by a returning of the pointer to an initial position. According to a particular embodiment, the action is detected when the pointer is moved successively from one corner of the screen to another corner of the screen of the computer 100, for example from the top right corner of the screen to the bottom right corner of the screen.

According to a particular embodiment, the terminal 100 detects an action when the pointer 104 is moved into a particular zone of the screen, for example into the zone 105 represented in FIG. 1. The zone 105 is for example a rectangular zone with a height substantially equal to the height of the screen of the terminal 101 and positioned in such a way that at least one side of the rectangular zone corresponds to an edge of the screen. In this way, when the terminal 101 is positioned to the right of the screen as in FIG. 1, by using for example a suitable support, the screen of the terminal 101 is located in the extension of the detection zone 105. The detection zone can be positioned differently depending on whether the terminal 101 is positioned on the right, on the left, above or below the screen of the terminal 100. Such an arrangement is advantageous in as much as the keyboard sharing software generally triggers the transfer of the keyboard and mouse commands from a first terminal to an associated second terminal when the mouse pointer reaches a predefined edge of the screen of the first terminal: the side of the detection zone 105 thus corresponds to the edge of the screen configured to trigger a transfer of the mouse/keyboard interactions to the terminal 101. In this way, the pointer 104 is detected in the zone 105 before reaching the right edge of the screen of the computer 100 of FIG. 1.

According to a particular embodiment, the width of the detection zone 105 is modified according to the speed of movement of the pointer 104 on the screen of the terminal 101. The width of the zone 105 is then determined by a time T needed for the pointer 104 to horizontally cover the zone 105. For that, the computer 100 measures the speed of movement of the pointer and determines the width of the zone 105 so that the movement of the pointer 104 from one side to the other of the zone 105 at the measured speed corresponds to the time T. For example, if the width of the zone 105 is configured with a time T equal to 20 milliseconds and the computer 100 observes that the pointer covers 5 centimeters in 10 milliseconds, a zone 10 centimeters wide will be defined.

According to a particular embodiment, the time T is determined according to the time needed to unlock the terminal 101. In this way, between the moment when the pointer 104 enters into the zone 105 from the left and the moment when the pointer 104 reaches the right edge of the screen of the computer 100, the terminal 101 has been able to be unlocked.

Obviously, in the description relating to the detection zone 105 above, the terms "width" and "height" of the zone can be reversed depending on the relative position of the terminal in relation to the screen. Thus, when the terminal is positioned above or below the screen of the terminal 100, the detection zone 105 has a width substantially equal to the width of the screen of the terminal 101.

When an action is detected in the step 202, the computer 100 implements a step 203 of transmission of a notification to the terminal 101, the notification comprising at least one command suitable for unlocking the first terminal. The notification is for example a message encrypted using the encryption key SK exchanged in the association step 201. The notification can also be a message of "push notification" type, the sending of which is triggered by the computer 100.

Such a notification comprises an unlock command such as an unlock code transmitted to the computer 100 by the terminal 101 in the association step.

On reception of such a notification, the terminal 101 decrypts the message and checks the validity of the unlock code. If the unlock code is valid, that is to say if it bears out the criteria described previously, the terminal 101 is unlocked and a confirmation message is sent to the computer 100.

Figure 3:
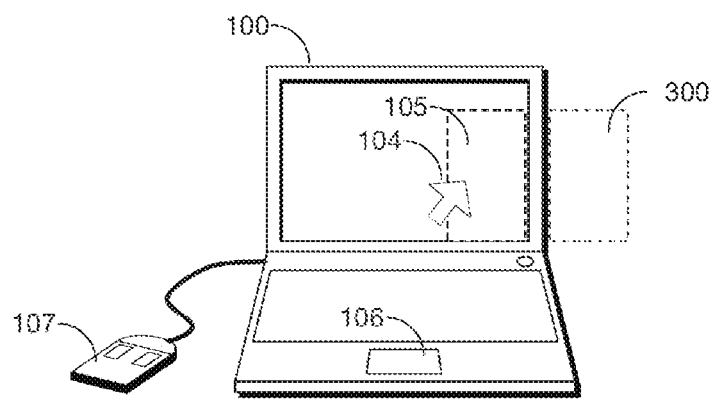
FIG. 3 represents a terminal on which a virtual screen is configured.

The computer 100 receives the unlock confirmation in a step 204 during which a virtual screen 300 contiguous to the detection zone 105 is configured on the computer 100, as represented in FIG. 3. The virtual screen 300 has dimensions substantially equal to the dimensions of the screen of the terminal 100. When the pointer 104 reaches the right edge of the detection zone 105, the movement of the pointer is extended to the screen of the terminal 101 so as to reflect, on the screen of the terminal 101, the movements of the pointing device associated with the terminal 100. For that, the terminal 100 regularly transmits to the terminal 101 the coordinates of the pointer 104 as well as other interactions of the user with the pointing device, for example information according to which the user has pressed on a button of the mouse 107. Such a configuration of a virtual screen to extend the movements of a pointer to the screen of a terminal distinct from the terminal to which the pointing device is linked is known to the person skilled in the art, so it will not be detailed here in more detail.

The activation method thus makes it possible to perform an unlocking of the terminal 101 from a pointing peripheral device associated with the computer 100. In this way, the user does not have to perform any manipulation on the terminal to perform the unlocking. The use of a detection zone such as the zone 105 described previously makes it possible to anticipate the arrival of the pointer in the virtual screen zone. Thus, the terminal 101 can be unlocked before the pointer reaches the configured virtual screen. In this way, the user does not wait for the unlocking to continue a movement of the pointer to the virtual screen corresponding to the screen of the terminal, and the user experience is enhanced thereby.

Figure 4:
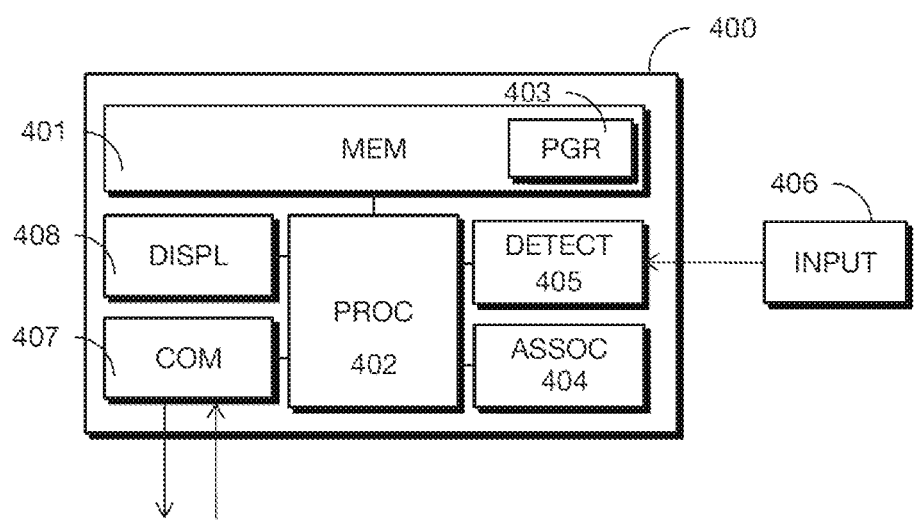
FIG. 4 represents the architecture of a device suitable for implementing the method.

FIG. 4 represents the hardware architecture of a device 400 suitable for implementing the activation method according to a particular embodiment.

The device 400 comprises a storage space 401, for example a memory MEM, a processing unit 402 equipped for example with a processor PROC. The processing unit can be driven by a program 403, for example a computer program PGR, implementing the allocation method as described above with reference to FIG. 2, and in particular the steps of association of the device with a terminal, of detection of an action on an input peripheral device associated with the device, and of transmission of a notification to the terminal, the notification comprising at least one command suitable for unlocking the terminal. According to a particular embodiment, the computer program PGR is configured to implement the method according to the different embodiments or features described previously.

On initialization, the instructions of the computer program 403 are for example loaded into a RAM (Random Access Memory in English) memory before being executed by the processor of the processing unit 402. The processor of the processing unit 402 implements the steps of the activation method according to the instructions of the computer program 403.

For that, the device 400 comprises a module 404 for associating the device with a terminal. Such a module can comprise means for detecting a terminal and for memorizing an association of the device with the terminal. The detection means are for example implemented by a computer program comprising instructions suitable for execution by the processor PROC of the device 400 and configured to receive, from a communication interface of the device, an announcement or discovery message broadcast by a terminal. The association module also comprises means for generating a private key/public key pair suitable for encrypting a communication with a detected terminal and for receiving, securely from the terminal, an authentication element allowing the terminal to be unlocked by the device. The association means comprise computer program instructions configured to generate a pair of private/public keys, for example by implementing an algorithm of RSA type, the instructions being suitable for execution by a processor such as the processor PROC. The association module further comprises a memory, for example a database, suitable for memorizing the keys generated in association with an identifier of the detected terminal.

The device 400 also comprises a module 405 for detecting an action on an input peripheral device 406 associated with the device. Such a module is for example implemented by computer program instructions configured to detect interactions of a user on an input peripheral device associated with the device and suitable for execution by the processor PROC of the device. For example, the instructions are configured to obtain coordinates of a pointer of a mouse connected to a screen of the device, and determine, from the coordinates obtained, that a particular action has been performed by checking that the coordinates obtained correspond to a predetermined movement whose characteristics are memorized beforehand in a memory of the device. The input peripheral device 406 is for example a computer mouse, a touch surface, a keyboard or any other device allowing a user to interact with the device.

According to a particular embodiment, the detection module is suitable for detecting the movement of a pointer associated with the pointing device 406 in a particular zone of a screen 408 of the device. For that, the detection module comprises computer program instructions configured to obtain coordinates on the screen 408 of a pointer associated with the input peripheral device 406 and compare these coordinates with the coordinates of a defined zone on the screen of the device. The instructions are also configured so that, when the comparison indicates that the pointer is moving or is situated within the zone defined on the screen, the detection module commands the communication module 407 the transmission of a notification suitable for unlocking the terminal.

Optionally, the device can comprise a module for determining at least one dimension of the detection zone according to the speed of movement of the pointing device. For that, the determination module can comprise a memory in which are memorized instructions configured to compute a speed of movement of a pointer on a screen of the device, for example by obtaining, at regular intervals, the position of the pointer. The instructions are also configured to define a dimension of the detection zone in correlation with the determined speed, such that the greater the measured speed, the greater the size of the detection zone.

The device 400 further comprises a communication module 407 configured to transmit a notification to the first terminal, the notification comprising at least one authentication datum suitable for unlocking the first terminal. The communication module is for example an Ethernet, WiFi or Bluetooth network interface, a cellular network interface or even a serial communication link such as a USB cable. The communication module is for example driven by computer program instructions suitable for generating a message comprising an encrypted element generated by the association module 404, and suitable for authorizing the unlocking of the terminal associated with the device when the terminal receives the message comprising such an encrypted element.

According to a particular embodiment, the device is incorporated in a personal computer, a mobile terminal or a tablet.

The invention claimed is:

1. A method for activating a first terminal from a second terminal, the first terminal and the second terminal being associated and connected via a communication network, the method being comprising the following acts performed by the second terminal:
    detecting an action on an input peripheral device associated with the second terminal, in a predefined rectangular zone on a screen of the second terminal having at least one side contiguous with an edge of the screen of the second terminal, wherein the action moves a pointer, and at least one dimension of the predefined rectangular zone is determined according to a speed of movement of the pointer; and
    transmitting a notification to the first terminal, the notification comprising at least one command suitable for unlocking the first terminal.

2. The method according to claim 1, further comprising associating the first terminal with the second terminal by exchanging at least one encryption key between the first and second terminals, the notification transmitted to the first terminal comprising at least one datum encrypted using the encryption key.

3. The method according to claim 1, wherein the input peripheral device is a pointing peripheral device.

4. The method according to claim 1, wherein the second terminal is also configured to transmit to the first terminal interactions detected on input peripheral devices when the pointer reaches said edge of the screen of the second terminal.

5. A device for activating a terminal, the terminal being connected to and associated with the device via a communication network, the device comprising:
    a processor; and
    a non-transitory computer-readable medium comprising instructions stored thereon which when executed by the processor configure the device to perform acts comprising:
    detecting an action on an input peripheral device associated with the device, in a predefined rectangular zone on a screen of the device having at least one side contiguous with an edge of the screen of the device, wherein the action moves a pointer, and at least one dimension of the predefined rectangular zone is determined according to a speed of movement of the pointer; and
    transmitting a notification to the terminal, the notification comprising at least one command suitable for authorizing unlocking of the terminal.

6. The device according to claim 5, wherein the device is implemented in a terminal that is distinct from the terminal that is connected to the device over the communication network.

7. A non-transitory computer-readable medium comprising a computer program stored thereon and comprising instructions execution of a method for activating a first terminal from a second terminal, when the instructions are executed by a processor of the second terminal, the first terminal and the second terminal being associated and connected via a communication network, the instructions configuring the second terminal to perform acts comprising:
    detecting an action on an input peripheral device associated with the second terminal, in a predefined rectangular zone on a screen of the second terminal having at least one side contiguous with an edge of the screen of the second terminal, wherein the action moves a pointer, and at least one dimension of the predefined rectangular zone is determined according to a speed of movement of the pointer; and transmitting a notification to the first terminal, the notification comprising at least one command suitable for unlocking the first terminal.

\* \* \* \* \*